US008585337B1

(12) United States Patent
Dang (10) Patent No.: US 8,585,337 B1
(45) Date of Patent: Nov. 19, 2013

(54) PANEL MOUNTING DEVICE AND METHOD OF USE (75) Inventor: Phong Dang, Kent, WA (US)

(73) Assignee: Carlisle Interconnect Technologies, Inc., Kent, WA (US)

( * ) Notice: Subject to any disclaimer, the term of this patent is extended or adjusted under 35 U.S.C. 154(b) by 104 days.

(21) Appl. No.: 13/314,171

(22) Filed: Dec. 7, 2011

Related U.S. Application Data (60) Provisional application No. 61/420,480, filed on Dec. 7, 2010.

(51) Int. Cl.
*F16B 21/00* (2006.01)
(52) U.S. Cl.
USPC .......................................... 411/347; 411/354
(58) Field of Classification Search
USPC ......... 411/347, 348, 550, 552, 553, 354, 355, 411/358, 359, 363; 24/453, 628, 365
See application file for complete search history.

(56) References Cited

U.S. PATENT DOCUMENTS

| 3,145,441 | A | * | 8/1964 | Strandrud | 411/347 |
| 3,233,496 | A | * | 2/1966 | Frick et al. | 411/348 |
| 3,426,399 | A | * | 2/1969 | Jones | 269/48.1 |
| 3,596,554 | A | * | 8/1971 | Low et al. | 411/348 |
| 5,044,921 | A | * | 9/1991 | Micelli et al. | 425/451.9 |
| 7,126,823 | B2 | * | 10/2006 | Chen et al. | 361/702 |
| 7,806,427 | B2 | * | 10/2010 | Rudduck et al. | 280/728.2 |

* cited by examiner

*Primary Examiner* — Gary Estremsky
(74) *Attorney, Agent, or Firm* — Stoel Rives LLP (57) ABSTRACT

A mechanism for attaching a structure to a relatively flat panel includes a housing containing an outer button which contains an inner button. Displacement of the inner button into the outer button causes a moveable attachment portion to partially collapse toward a centerline which permits the moveable attachment portion to pass through an engagement aperture in the panel. Movement of the outer button into the housing permits the moveable engagement portion to extend past a back surface of the panel to engage the back surface and hold the attaching structure to the panel via forces exerted by biasing members once the buttons are released.

1 Claim, 7 Drawing Sheets

PANEL MOUNTING DEVICE AND METHOD OF USE

RELATED APPLICATION

This application claims the benefit under 35 U.S.C. §119(e) from U.S. Provisional Patent Application No. 61/420,480, filed Dec. 7, 2010, which is incorporated herein by reference.

TECHNICAL FIELD

The field of the present disclosure relates to mechanical devices for attachment to relatively flat panels via a hole in such panels.

BACKGROUND

Mechanical devices for attaching an electrical connector to an electrical panel (such as the computer cable example above) are typically configured to (1) secure an electrical connector to an electrical panel having a predetermined thickness, (2) secure an electrical connector to an electrical panel bearing a mating mounting component, or (3) require threaded rods and corresponding threaded apertures in the electrical panel. For example, one common type of panel mounting device uses a backing member and an opposing member that is designed to entrap a panel having a specific thickness there-between, such as disclosed in U.S. Pat. No. 4,148,542. Another type of commonly available panel mounting device includes rods having threaded ends that engage threaded apertures, such as devices disclosed in U.S. Pat. No. 6,116,942.

The present inventor has recognized that using commonly available fasteners to secure electrical connectors to panels, or to secure other suitable objects to relatively flat panels or surfaces is cumbersome because of the use of threaded fasteners or clip-style fasteners requires multiple different fasteners depending on the thickness of the panel. The present inventor has therefore recognized a need to provide improved attachment or mounting devices designed for use with panels having a range of thicknesses and for use without threaded fastening features.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
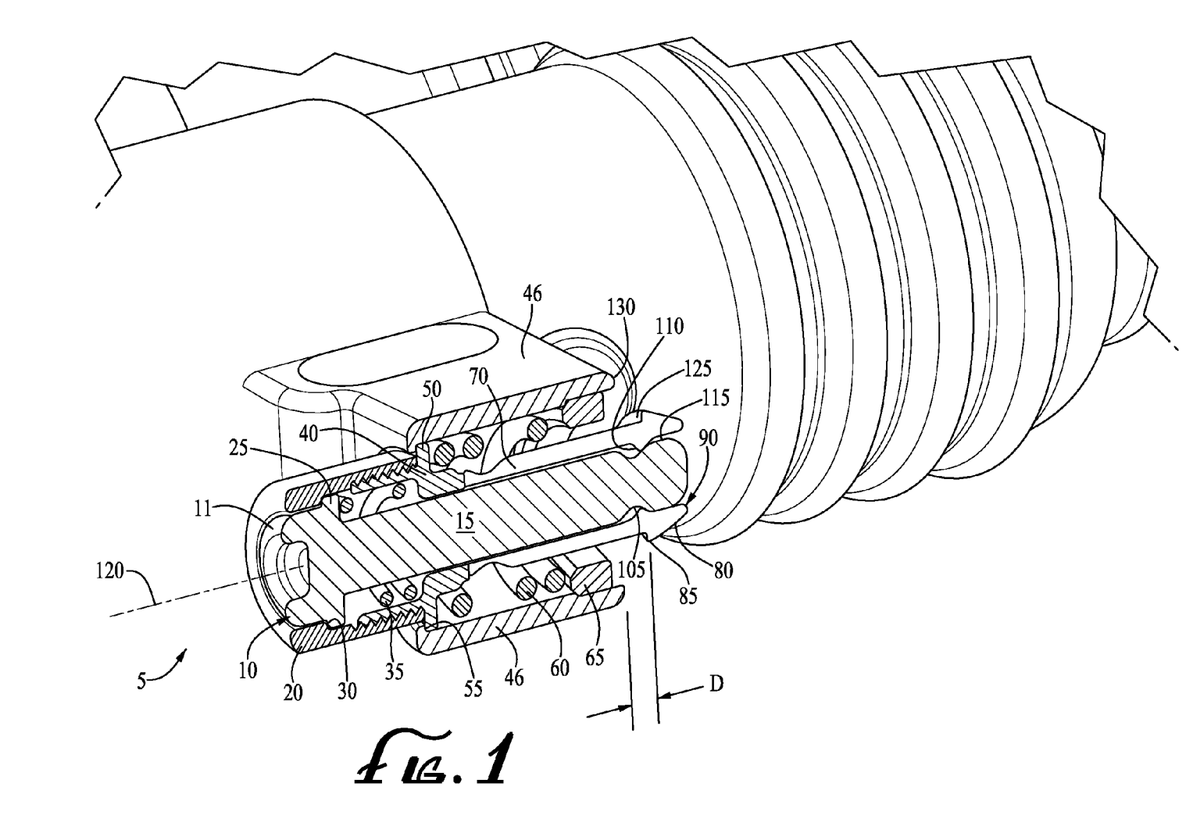
FIG. 1 illustrates a left-side isometric cross sectional assembly view of an exemplary attachment device.
Figure 2:
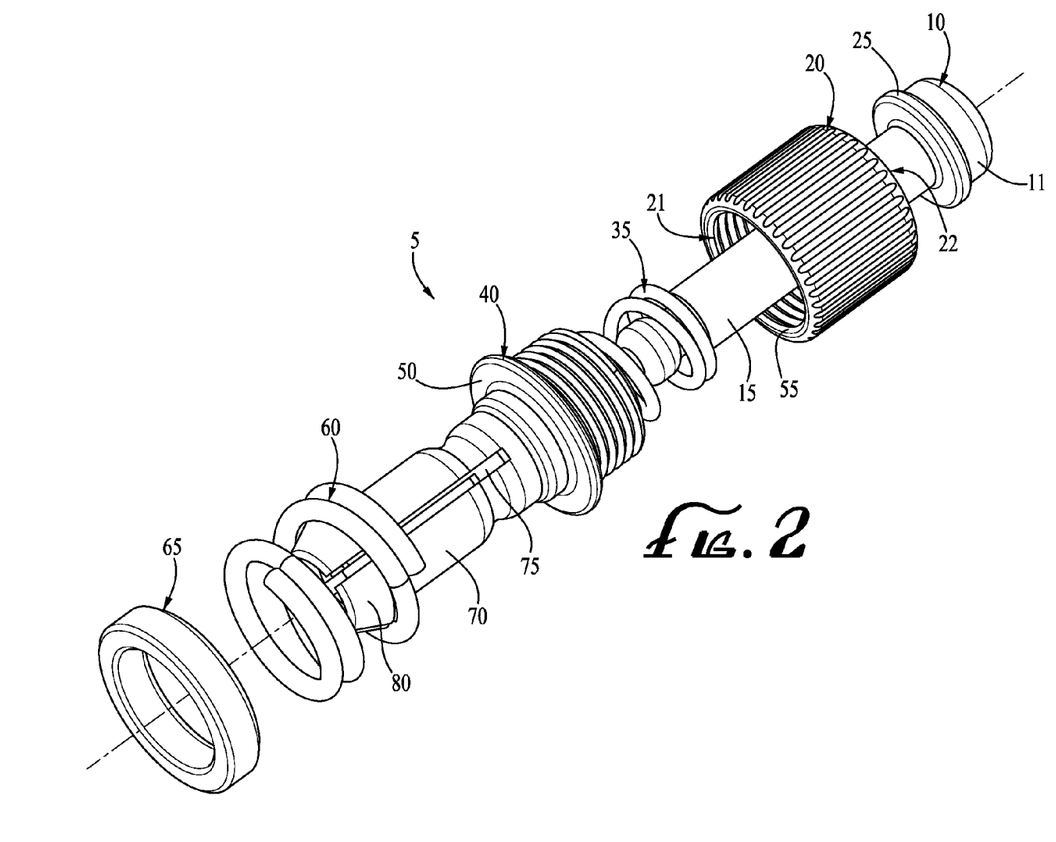
FIG. 2 illustrates a right rear-side partly exploded isometric view of the components for the attachment device of FIG. 1.
Figure 3:
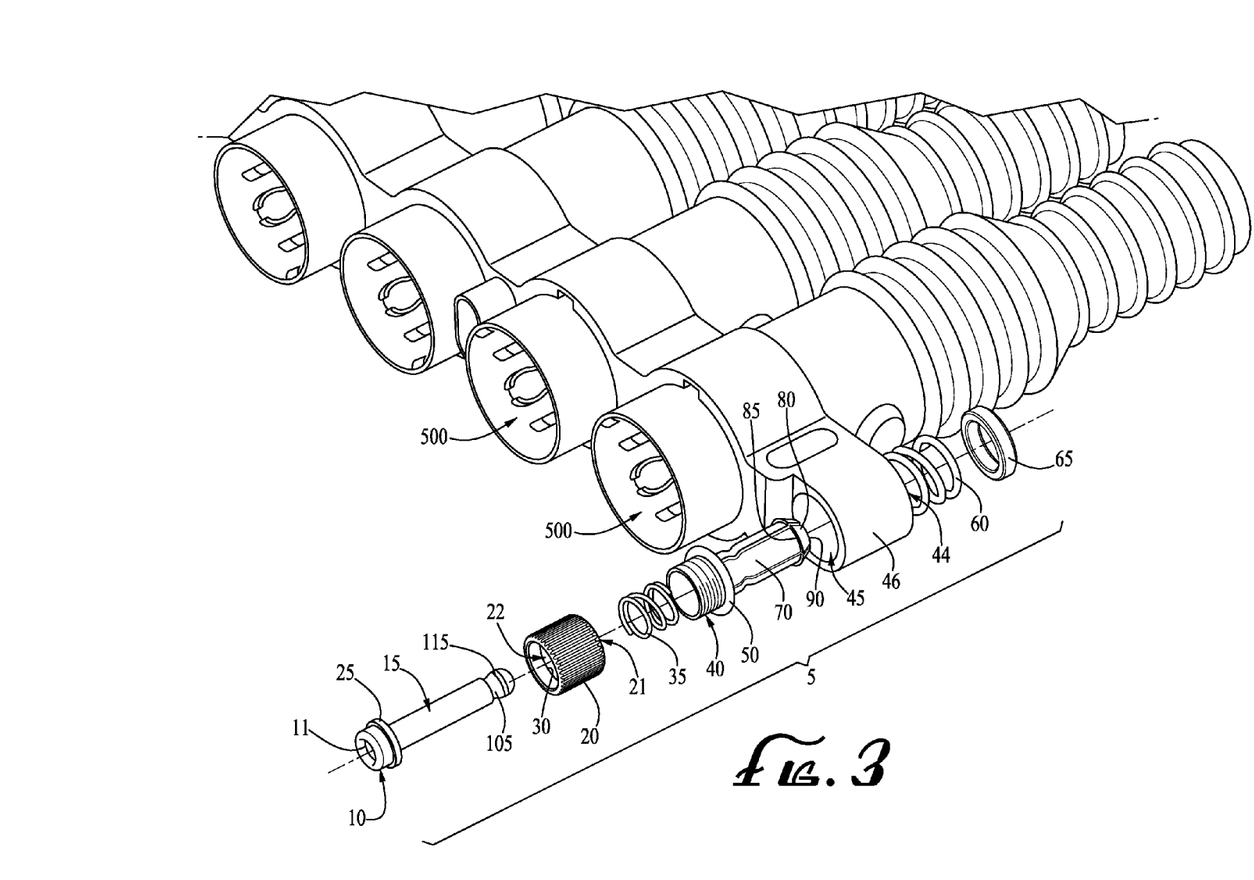
FIG. 3 illustrates a left front-side partly exploded isometric view of the components for the attachment device of FIG. 1.

FIGS. 1-3 illustrate an exemplary mounting, or attachment, device 5. Mounting device 5 is configured to releasably attach an object, such as an electrical connector 500 (FIG. 3), or other suitable structure, to panels or walls (for example, panel 95, FIG. 4) having different thicknesses. In the embodiment illustrated in FIGS. 1-3, mounting device 5 is configured to attach to a flat surface having a thickness ranging from approximately 0.040 of an inch to approximately 0.10 of an inch. In other embodiments, an attachment device, such as mounting device 5, may be configured to attach to panels of different suitable thicknesses. In contrast, conventional fasteners are commonly designed to accommodate a single thickness, for example, existing fasteners for attaching an electrical connector housing to a flat surface bearing electronic devices. Therefore, different conventional fasteners typically need to be used when it is desired to attach an electrical connector housing to a panel or wall having a different thickness.

In a preferred arrangement, a panel mounting device 5 is configured to be pushed, for example, like pushing a button, to attach into an aperture in a flat surface. Panel mounting device 5 is also configured to be pushed, again, like a button, to release from an aperture in a flat surface. A discussion of assembling an exemplary panel mounting device 5 is followed by operation of a panel mounting device.

Assembly

A panel mounting device 5 includes an inner button 10 having a shaft 15, which may be integrally formed with inner button 10, or may be attached via threads, adhesive, or other suitable attachment. Inner button 10 is inserted into an outer button 20 until a shoulder 25 of inner button 10 contacts an inner lip 30 of outer button 20. Inner button 10 is preferably inserted through a rear aperture 21 (FIGS. 2-3) of outer button 20 so that a button head 11 projects through a front aperture 22 of outer button 20. A spring 35 is placed over shaft 15 followed by a collar 40. Collar 40 is attached to outer button 20, for example, via a threaded, press fit, or other suitable engagement, and spring 35 is preferably slightly compressed between collar 40 and shoulder 25. If threads are used to secure collar 40 to outer button 20 a thread locking material, such as one of the products under the Loktite® brand available from, Henkel AG & Co. KGaA of Düsseldorf, Germany is preferably used. Spring 35 urges shoulder 25 of inner button 10 against inner lip 30 of outer button 20.

The button assembly, which includes inner button 10, outer button 20, spring 35, and collar 40, is inserted through a back side 44 of a button housing aperture 45 (best illustrated in FIG. 3) of a button housing 46, so that a shoulder 50 of collar 40 contacts an inner lip 55 (best illustrated in FIG. 1) of the button housing aperture 45. Engagement of shoulder 50 with inner lip 55 prevents the button assembly from exiting through the front side of the button housing aperture 45.

A spring 60 is placed into the button housing aperture 45 over collar 40 (which overlies shaft 15) and contacts the shoulder 50 of collar 40. A ring 65 is threaded, press fit, or otherwise suitably secured, into the back side 44 of the button housing aperture 45. Preferably, spring 60 is slightly compressed between ring 65 and shoulder 50 to urge shoulder 50 of collar 40 against inner lip 55 of button housing 46.

Collar 40 includes cantilever beams 70 separated by slots 75 (best illustrated in FIG. 2). Each cantilever beam 70 includes a ramped surface 80 and a snap-lock ridge 85 proximate the free end 90. The purpose of the cantilever beams 70, ramped surfaces 80, and snap-lock ridges 85 are explained below with respect to operation of a panel mounting device.

Operation

Securing an electrical connector 500 (FIG. 3) to a relatively flat panel 95 (FIG. 4) is described below, however panel mounting devices, such as panel mounting device 5, are not limited to securing electrical connectors to panels. For example, other embodiments may include a modified button housing that permits use of a panel mounting device in a manner similar to use of a Cleco-style fastener, or other embodiments may attach other suitable devices to relatively flat panels or other suitable objects.

Attachment

Figure 4:
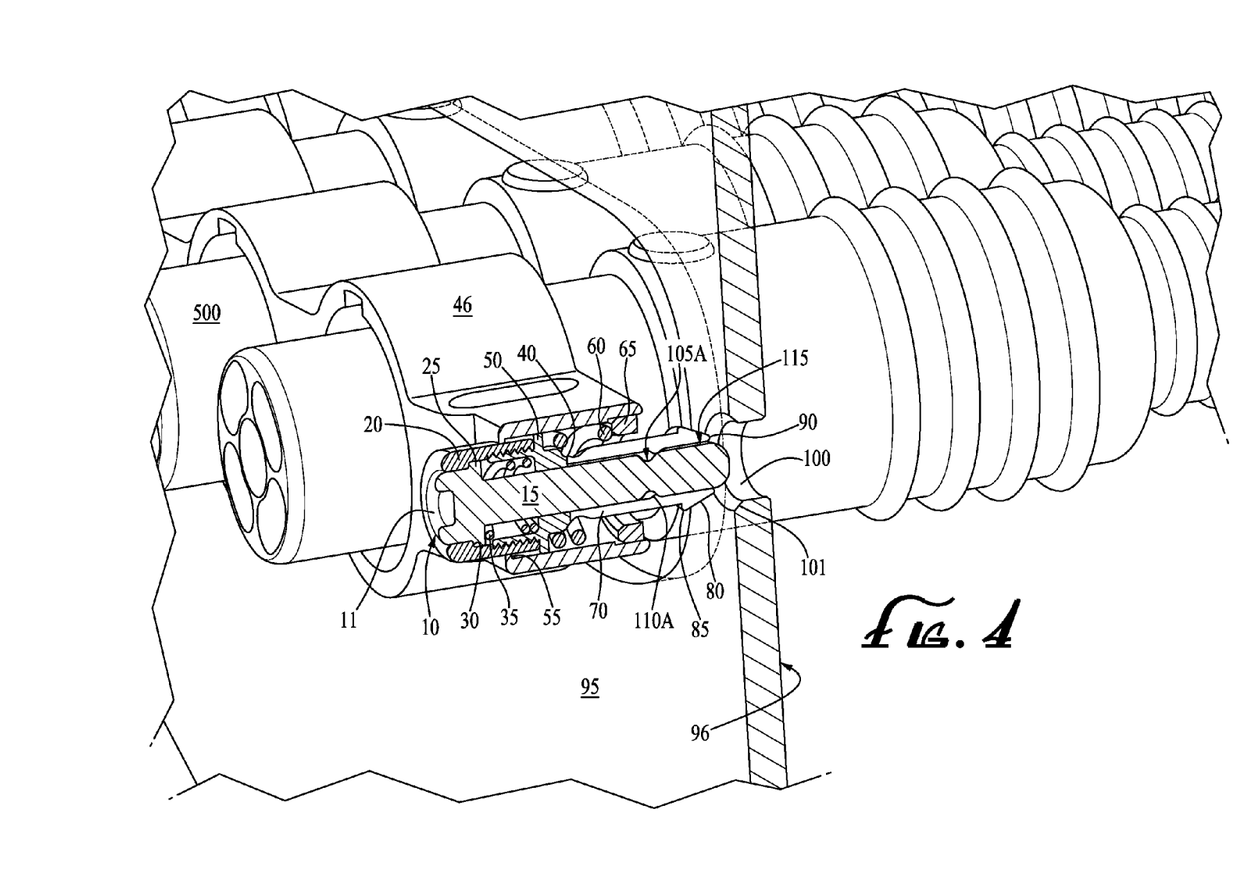
FIG. 4 illustrates a left-side isometric cross sectional assembly view of another attachment device prior to installation in a panel.
Figure 5:
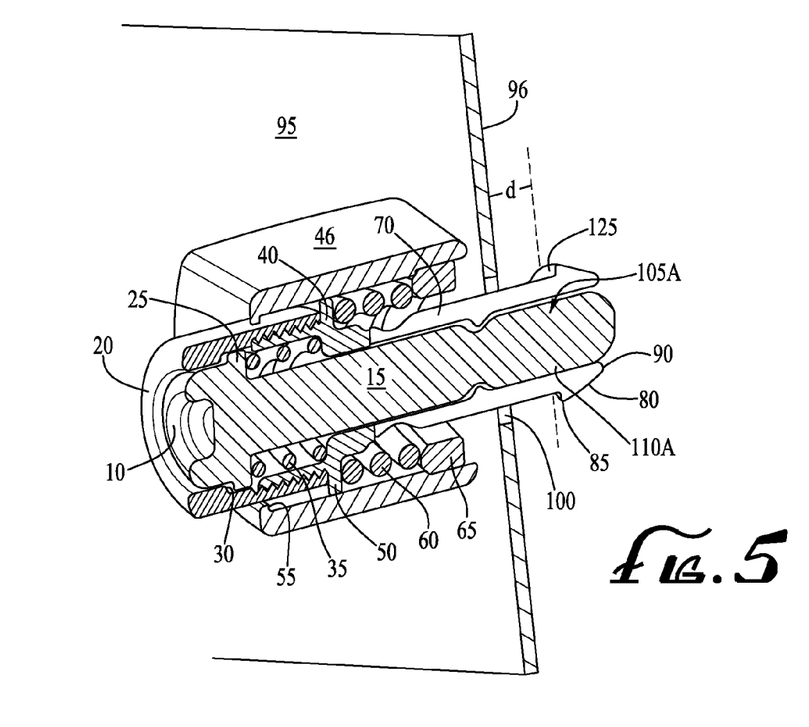
FIG. 5 illustrates a left-side isometric cross sectional assembly view of the attachment device of FIG. 4 during installation in a panel.
Figure 6:
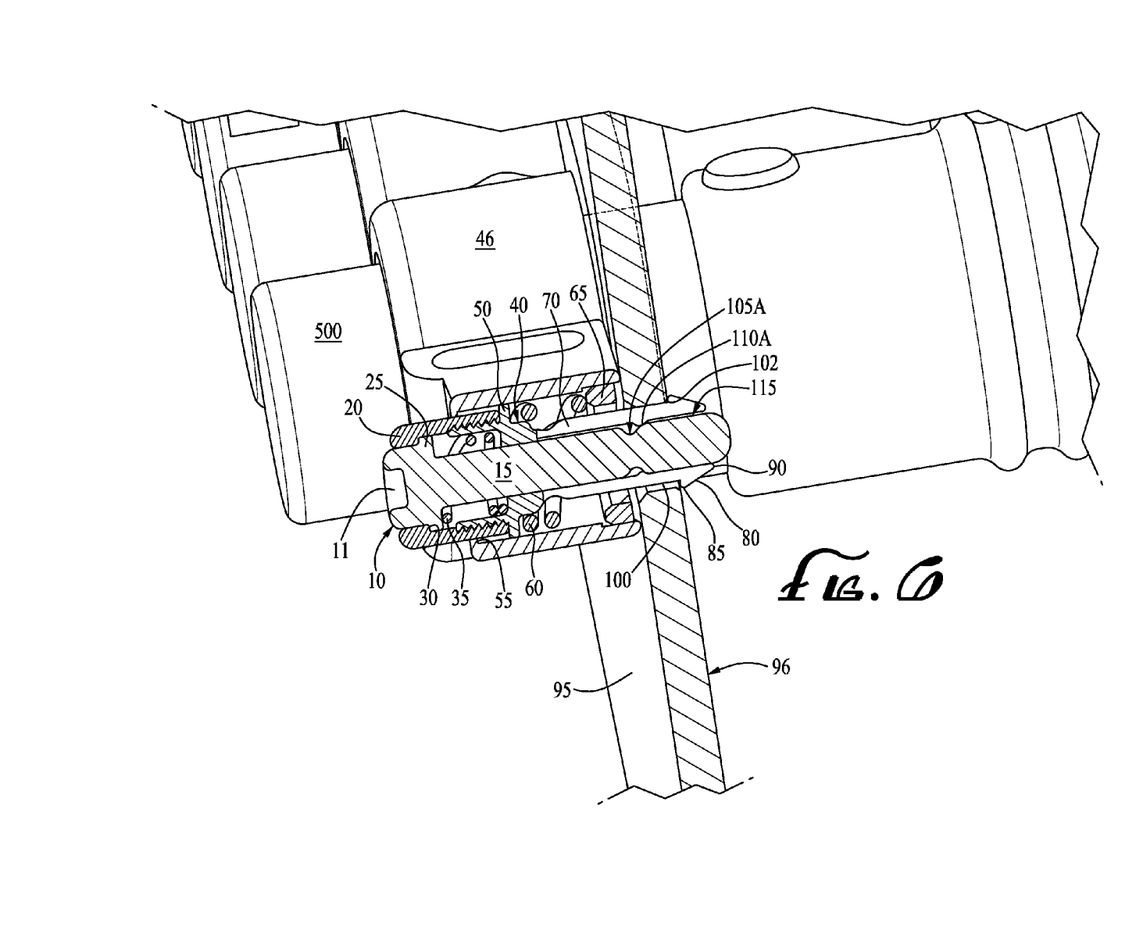
FIG. 6 illustrates a left-side isometric cross sectional assembly view of the attachment device of FIG. 4 installed in a panel.

With reference to FIGS. 4-6, securing panel mounting device 5 to a panel 95 is preferably accomplished by aligning the cantilever beams 70 with an attachment aperture 100 in the panel 95 and contacting the ramped surfaces 80 against the circumference of the attachment aperture 100. Note that aperture 100 preferably includes a chamfer 101 facing the panel mounting device 5, but does not include a chamfer on the opposing side 96 of the panel 95. A small radius 102 may be included in the aperture 100 on the opposing side 96 to facilitate detaching the panel mounting device 5 from the panel 95 as described below with reference to FIG. 7.

A user pushes inner and outer buttons 10 and 20 toward the panel 95 which initially moves the inner button 10 approximately 0.010 of an inch into outer button 20 (as best illustrated in FIG. 5) because the interaction of the ramped surfaces 80 with the circumference of the attachment aperture 100 inhibits movement of the cantilever beams 70 through the attachment aperture 100.

The shaft 15 of inner button 10 thus moves toward panel 95 causing a circumferential groove 105A to partially align with a circumferentially-oriented ridge 110A located on an internal surface (i.e., facing the shaft 15) of each cantilever beam 70 (as best illustrated in FIG. 5). The "A" suffix denotes that the circumferential groove 105A and circumferentially-oriented ridge 110A of FIGS. 4-7 are at difference locations relative to the similar circumferential groove 105 and circumferentially-oriented ridge 110 of FIGS. 1-3.

Contact between an outer surface 115 of shaft 15 and ridges 110A causes the free ends 90 of cantilever beams 70 to flex away from a central axis 120, thus cantilever beams 70 exert a spring force that urges the free ends 90 toward the central axis 120. Therefore, when groove 105A partially aligns with ridges 110A, the free ends 90 of cantilever beams 70 move sufficiently toward the central axis 120 to permit ramped surfaces 80 and snap-lock ridges 85 to pass entirely through the attachment aperture 100. Interaction between chamfer 101 and ramped surfaces 80 preferably facilitates snap-lock ridges 85 passing entirely through the attachment aperture 100.

Button housing 46 contacts panel 95, and as the user continues to push on the inner button 10 and the outer button 20, spring 60 compresses and the cantilever beam portions 70 of collar 40 extend through the attachment aperture 100 (best illustrated in FIG. 5). As the user continues to push on the inner button 10 and outer button 20 the snap-lock ridges 85 pass entirely through the attachment aperture 100. Preferably, snap-lock ridges 85 make an audible click as they pass through the attachment aperture 100. As illustrated in FIG. 5, spring 60 is close to its maximum compression amount, and thus collar 40 is close to its maximum extension through panel 95. As seen in FIG. 5, panel 95 may have a range of thicknesses and mounting device 5 remains capable of securing itself and an associated object to panel 95. For example, a back surface 96 of panel 95 could be located anywhere over distance "d" and the back surface 125 of snap-lock ridges 85 would be able to move past and engage the back surface 96 as described below.

Snap-lock ridges 85 pass through the attachment aperture 100 and frictionally engage the back surface 96 of panel 95, for example, evidenced by the audible click. In a preferred embodiment, such frictional engagement is via contacting the back surface 125 of snap-lock ridges 85 against the back surface 96 of panel 95. The user ceases pushing on the inner button 10 and the outer button 20. The frictional engagement of the back surface 125 of snap-lock ridges 85 against the back surface 96 of panel 95 prevents spring 60 from urging shoulder 50 of collar 40 into contact with inner lip 55 of button housing 46 (as best illustrated in FIG. 6). Spring 35 thus urges inner button 10 back to its home position with respect to outer button 20, that is, with shoulder 25 engaging inner lip 30. When inner button 10 moves back to its home position with respect to outer button 20, groove 105A no longer partially aligns with ridges 110A, thus causing outer surface 115 of shaft 15 to engage ridges 110A and move the free ends 90 of the cantilever beams 70 away from the central axis 120.

Back surfaces 125 of snap-lock ridges 85 further engage the back surface 96 of the panel 95 while outer button 20 remains displaced approximately 0.040 of an inch (as best illustrated in FIG. 6) from its home position with respect to button housing 46. Of course, the amount of displacement of outer button 20 with respect to its home position depends on the thickness of panel 95. In a preferred arrangement, mounting device 5 is sized and configured to attach through apertures in panels having thicknesses ranging from approximately 0.040 inch to approximately 0.10 inch. Thus, the cantilever beams 70 are prevented from exiting the attachment aperture 100 and spring 60 urges button housing 46 and back surfaces 125 of the cantilever beams 70 toward each other to apply a pinching force to panel 95. The force exerted by spring 60 thus causes mounting device 5 to securely engage the panel 95.

When mounting device 5 is secured to panel 95, the spring 60 pushes against shoulder 50 to urge collar 40 away from the panel 95. However, the thickness of the panel 95 prevents shoulder 40 from contacting inner lip 55. Thus, spring 60 exerts a sufficient force to secure button housing 46 to flat panel 95. Note that the force exerted by spring 60 increases as the thickness of flat panel 95 increases. In a preferred arrangement, spring 60 includes a relatively linear spring force of 110 pounds per inch. Other suitable spring forces may be used, including non-linear spring forces.

In a preferred arrangement, before a mounting device 5 secures an object to a panel 95 the distance "D" (FIG. 1) from the back surface 125 of snap-lock ridge 85 is approximately 0.035 inch from the back face 130 of a button housing 46. Thus, mounting device 5 can secure the button housing 46 (and anything attached to the button housing 46, such as an electrical connector 500) to a panel 95 with a thickness of approximately 0.040 inch, or thicker. The range of travel of outer button 20 through a panel mounting device aperture, such as panel mounting device aperture 100, for example, preferably allows mounting device 5 to also secure the button housing 46 to panels, such as panel 95, with thicknesses up to approximately 0.100 inch. In other embodiments, the distance between the back surface 125 of snap-lock ridge 85 and the back face 130 of button housing 46, the range of travel of outer button 20 through a panel mounting device aperture, or both, may be modified to permit a mounting device, such as mounting device 5, to secure a button housing or other suitable structure to panels having different ranges of thicknesses.

Preferred embodiments do not require tools, other than a user's hands, to attach a mounting device 5 to a panel 95, or to another suitable structure.

Disengagement

Figure 7:
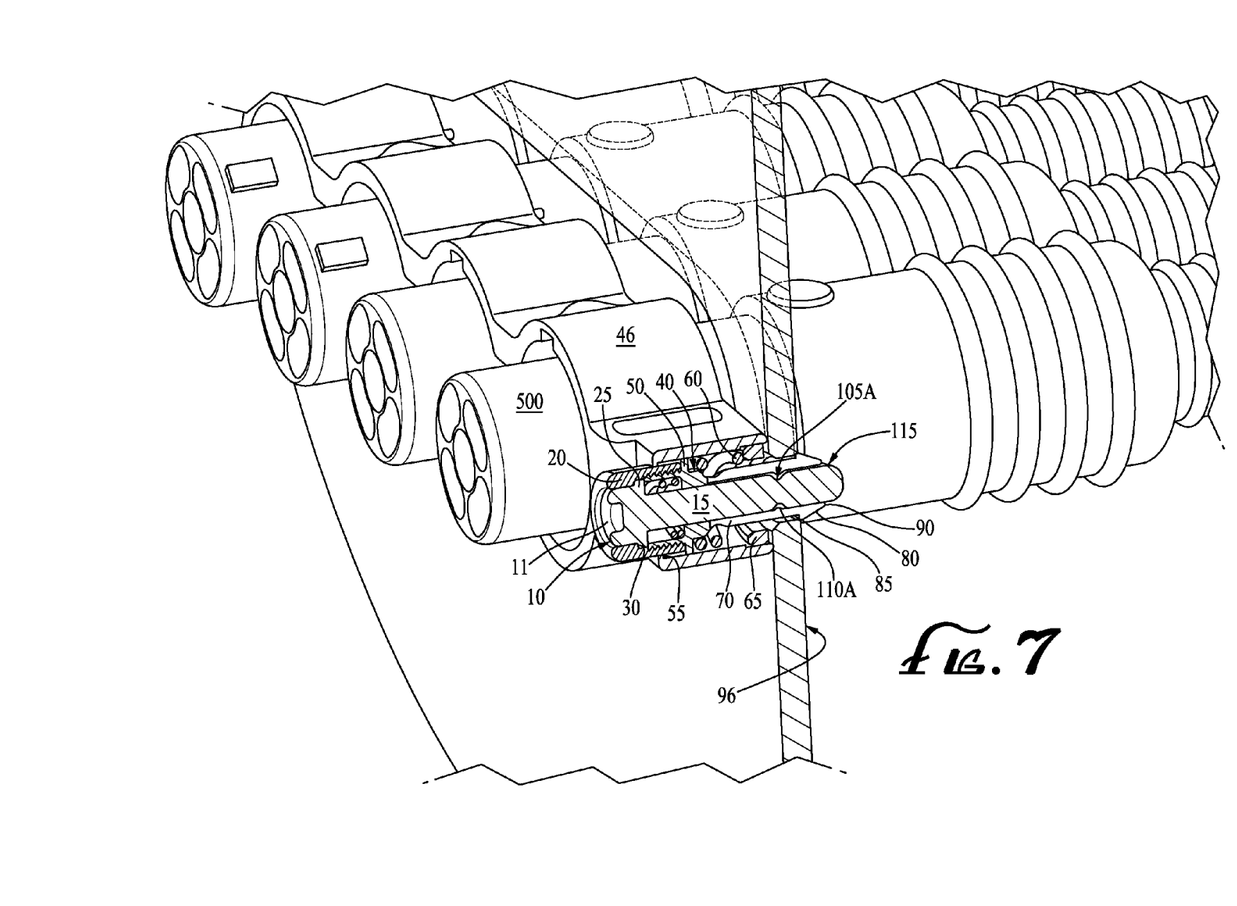
FIG. 7 illustrates a left-side isometric cross sectional assembly view of the attachment device of FIG. 4 being detached from a panel.

To disengage the mounting device 5 from the attachment aperture 100 a tool, such as a small diameter screwdriver shaft, pencil, or other suitable object, is used to push inner button 10 into outer button 20 as illustrated in FIG. 7. In other embodiments, a button head, such as button head 11 projects sufficiently past outer button 20 to permit a user's hand to be used to push inner button 10 into outer button 20, thus requiring no tool for disengagement. Because the spring force for spring 35 is less than the spring force for spring 60, collar 40 does not move toward panel 95 when inner button 10 is pressed into outer button 20.

Inner button 10 is moved into outer button 20 until circumferential groove 105A aligns with circumferentially-oriented ridges 110A on cantilever beams 70. In other words, the spring force acting toward central axis 120 exerted by the cantilever beams 70 is able to move ridges 110A into the deepest portion of groove 105A. When groove 105A aligns with ridges 110A the free ends 90 of the cantilever beams 70 move toward central axis 120 sufficiently far to permit snap-lock ridge 85 to exit attachment aperture 100. Spring 60 is preferably sufficiently strong to overcome any frictional force created by engagement of the back surfaces 125 of snap-lock ridges 85 and the back side 96 of the flat panel 95 when the free ends 90 of the cantilever beams 70 are at their maximum displacement toward central axis 120 permitted by ridges 110A moving into groove 105A. Spring 60 thus causes collar 40 to move away from panel 95 until shoulder 50 engages inner lip 55 which causes cantilever beams 70 to pull their associated snap-lock ridges 85 out through engagement aperture 100. Mounting device 5 thus "jumps" out of engagement aperture 100 when inner button 10 is displaced sufficiently far into outer button 20 to align groove 105A with ridges 110A.

It will be obvious to those having skill in the art that many changes may be made to the details of the above-described embodiments without departing from the underlying principles of the invention.

The invention claimed is:

1. A panel mounting device comprising:
an inner button including a shaft extending away from a button head, wherein the shaft includes a groove distal from the inner button head;
an outer button substantially surrounding the inner button head and a portion of the shaft;
a collar non-slidably engaging the outer button and slidably engaging the shaft, wherein the collar includes a cantilever beam portion (a) having a ridge configured to engage the groove of the shaft and (b) terminating with a snap-lock ridge;
a first spring located between the collar and the inner button head, wherein the first spring urges a first shoulder of the inner button head against a first inner lip of the outer button;
a button housing surrounding a portion of the collar, wherein the inner and outer buttons are moveable with respect to the housing; and
a second spring secured between the collar and the button housing, wherein the second spring urges a second shoulder of the collar against a second inner lip of the button housing, and wherein a spring force of the second spring is stronger than a spring force of the first spring.

* * * * *